United States Patent [19]

Mielke

[11] Patent Number: 4,737,802

[45] Date of Patent: Apr. 12, 1988

[54] FLUID JET PRINTING DEVICE

[75] Inventor: Klaus Mielke, Mölnlycke, Sweden

[73] Assignee: Swedot System AB, Gothenburg, Sweden

[21] Appl. No.: 890,843

[22] PCT Filed: Dec. 20, 1985

[86] PCT No.: PCT/EP85/00724

§ 371 Date: Jul. 21, 1986

§ 102(e) Date: Jul. 21, 1986

[87] PCT Pub. No.: WO86/03717

PCT Pub. Date: Jul. 3, 1986

[30] Foreign Application Priority Data

Dec. 21, 1984 [SE] Sweden .............................. 84 06552

[51] Int. Cl.[4] .............................................. G01D 15/16

[52] U.S. Cl. ........................... 346/140 R; 251/129.15; 251/359; 346/75; 417/413

[58] Field of Search ................................ 346/75, 140; 251/129.15, 359; 417/480, 413

[56] References Cited

U.S. PATENT DOCUMENTS 4,199,767 4/1980 Campbell .............................. 346/75
4,378,564 3/1983 Cross .................................... 346/75

FOREIGN PATENT DOCUMENTS 2905063 8/1980 Fed. Rep. of Germany .

*Primary Examiner*—Joseph W. Hartary
*Attorney, Agent, or Firm*—Finnegan, Henderson, Farabow, Garrett & Dunner

[57] ABSTRACT

The present invention relates to a fluid jet printing device A to U having an inlet 14, an outlet nozzle 13 and a valve 3, 5 located between the inlet and the outlet. The valve comprises a movable actuation member 3 cooperating with a valve seat.

For enhancing the drop generation frequency, a diaphragm-like partition wall PW is arranged between the inlet and the outlet. Said partition wall includes the valve seat VS.

5 Claims, 2 Drawing Sheets

FLUID JET PRINTING DEVICE

The present invention relates to a fluid jet printing device.

Fluid jet printing devices having an inlet which is connected to a source for feeding ink or another printing fluid to the device, further comprising an outlet formed by a nozzle for forming drops and a valve located between the inlet and the outlet are commonly known in the art and commercially available as so-called ink jet printers. Printers of this kind or a similar kind are known from the following references which are cited as a technical background with respect to the present invention: EP-A 83 877, FR-A 23 38 089, GB-A 20 03 429, DE-A 29 05 063 and FR-A 24 98 988. Fluid jet printing devices of the kind mentioned above include a solenoid valve having a coil and a movable actuation member or body cooperating with a valve seat, said valve seat being located between the inlet and the outlet. The valve seat of prior art fluid jet printing devices is formed as a part of the valve housing located opposite to the actuation member.

As known per se in the art, characters are generated by fluid jet printers by ejecting a plurality of fluid drops for forming dots which together define the desired character. The fluid drops are generated by a number of jet nozzles of a number of fluid jet printing devices forming together a fluid printer. The jet nozzles are arranged in a side-by-side fashion. The nozzles are supplied from a common source for feeding fluid having a predetermined pressure over a plurality of solenoid valves, one for each nozzle, said valves being controlled by a programmable character generator which is connected to each of said solenoid valves. For complying with today's requirements concerning fluid jet printers, high actuation frequencies or drop generation rates are necessary. In case of generating characters by fluid jet printing devices forming drops having a diameter of 0.2 mm on the paper or registration medium, seven fluid jet nozzles are required in a side-by-side arrangement for forming a character height of approximately 1.5 mm. In case of a speed of the registration medium, e.g. the paper which is moved past the printing nozzles, of two meters per second, the necessary valve control frequency must be in the range of 2 kHz when accepting a dot size of approximately 1 mm. When considering these figures, it will be clear that a high drop-forming frequency is of utmost importance for high speed/high quality-printers. None of the prior art fluid jet printing devices fulfil the requirements as indicated above.

In view of this state of art, the present invention is based on the technical task of how to provide a fluid jet printing device having an increased drop-generation frequency.

This technical task is solved by a fluid jet printing device of the above-mentioned type having a diaphragm-like partition wall separating the inlet from the outlet and including the valve seat.

The flexible-diaphragm-like partition wall is bent when actuating the movable actuation member of the valve. The bending of the flexible diaphragm-like partition wall can be caused by the physical contact between the movable actuation member at the very moment of closing the valve seat or can alternatively be caused by a pressure-wave generated by the actuation member and bending the partition wall located opposite thereto without necessarily requiring any physical contact between the actuation member and the diaphragm-like partition wall. The bending of the diaphragm-like partition wall towards the outlet of the valve results in a pressure-peak shortly before or at the very moment of closing of the valve. The pulse-like increasing of the pressure of the fluid at the outlet side of the valve assists and promotes the generation of drops by the jet nozzle, these drops do not have any tendency of flowing together during their flight towards the paper or registration medium.

Advantageous embodiments of the fluid jet printing device in accordance with the present invention as well as a printer comprising a plurality of these printing devices are defined in the subclaims.

Hereinafter, preferred embodiments in accordance with the present invention will be described with reference to the attached drawings, in which.

Figure 1:
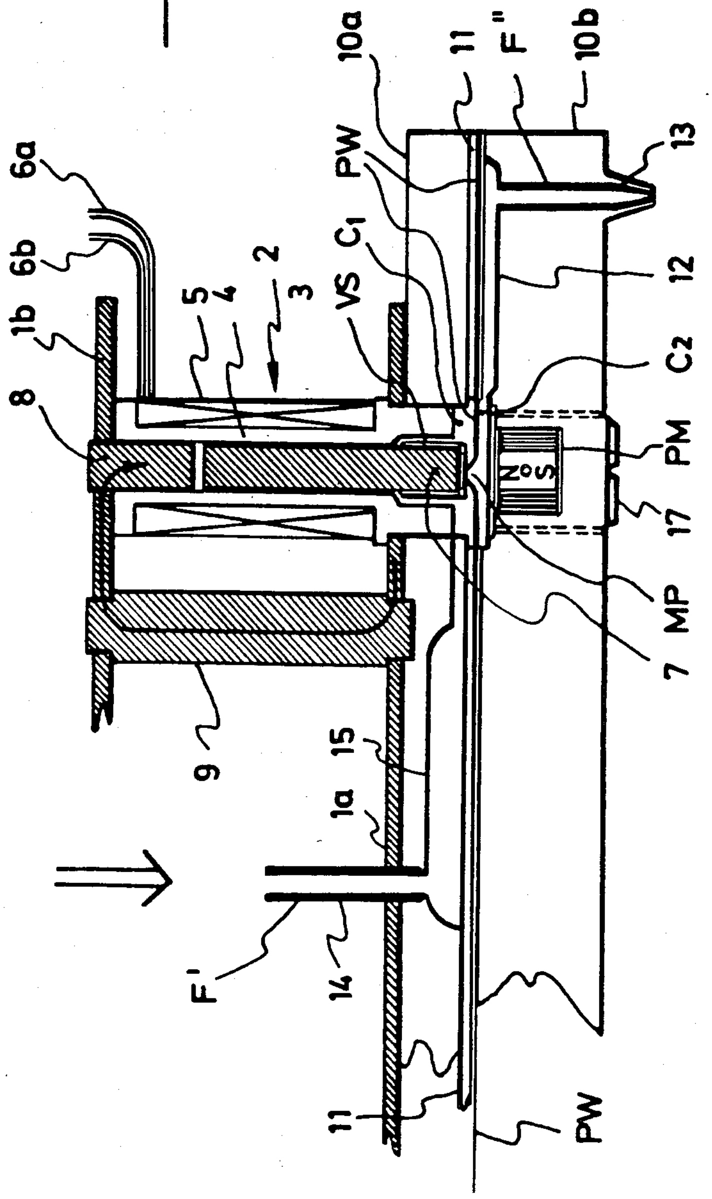
FIG. 1 shows a cut-view of an embodiment of the fluid jet printing device in accordance with the present invention.

The fluid jet printing device shown in FIG. 1 includes a first and a second mounting plate 1*a*, 1*b* to which a valve housing is fitted and secured. The valve housing consists in a valve body 3 of soft-magnetic material, preferably of a teflon-coated cobalt or nickel-iron alloy, which is movably journalled in a coil support 4, preferably of glass-ceramic material, by means of a magnetic coil 5 connected to a character generation circuit (not shown here) by means of electrical connection wires 6*a*, 6*b*. The lowermost end of the valve body 3 includes a sealing plate 7, preferably consisting of elastomeric material. An armature 8 and a rod-like distance member 9, fitted between the first and second mounting plate 1*a*, 1*b* form a magnetic circuit together with the valve body 3.

The first mounting plate 1*a* is attached to a first duct plate 10*a*, which in turn is connected to a second duct plate 10*b* via an interjacent sealing—or stuffing foil 11 preferably consisting of nylon plastic material. A fluid duct 12 is provided in the second duct plate 10*b*. Said fluid duct 12 extends to a jet nozzle 13. A registration medium, preferably a registration paper, is arranged to be moved past said jet nozzle 13 for a relative movement with respect thereto. The fluid F' is supplied from a source of pressure-fluid to the inlet 14 and is fed via a duct 15 in the first duct plate 10*a* into a first chamber $C_1$ containing the fluid having a pressure corresonding to the pressure of the fluid of said source (not shown here).

The first chamber $C_1$ is separated from a second chamber $C_2$ arranged in the second duct plate 10*b* by a diaphragm-like partition wall PW made of a thin, foil-like material, preferably stainless steel. The second chamber $C_2$ conducts the fluid F" via the duct 12 towards the outlet opening defined by the nozzle 13 having a diameter which is preferably in the range of 0.05 to 0.1 mm. The fluid in the first chamber $C_1$ has a pressure which is chosen to be in the range of 1 to 3 bars. The fluid in the second chamber $C_2$ has an atmospheric pressure in the closed position of the valve body 3 since the fluid duct system on this side of the partition wall PW is open towards the ambient air through the nozzle 13. The partition wall PW, which is fitted between the sealing or stuffing foil 11 and the second duct plate 10b has a cone-shaped valve seat VS defining a hole passage MP (medium passage) for the fluid. The valve seat VS coacts with the sealing plate 7 of the valve body 3.

The valve seat VS having a hole passage MP is manufactured by embossing or punching a hole in the foil material forming the partition wall PW. The foil material consisting of stainless steel has a thickness in the range of 0.01 to 0.3 mm, preferably in the range of 0.02 to 0.05 mm. By punching or embossing a hole in the foil material, a collar or cone-shaped valve seat is generated. The small thickness of the foil contributes to a minimal capillary effect although the hole diameter is as small as 0.05 to 0.1 mm. The minimal capillary effect results in a small pressure difference between the inlet and the outlet.

The partition wall can be moved or bent like a diaphragm or membrane due to its small thickness.

The second chamber $C_2$ has a very small extension in the direction of the movement of the valve body 3. A permanent magnet PM is mounted with respect to the second duct plate 10b immediately below the second chamber $C_2$. The permanent magnet is made of a steel alloy which is available under the tradename "SAMARIUM" having adapted magnetic properties and guaranteeing a high field strength. The permanent magnet PM is mounted in an adjustable screw 17, by which the position of the magnet relative to the valve seat VS and with respect to the valve body 3 in contact with the valve seat 3 in the closed resting position of the valve can be changed. Due to the force exerted on the soft-magnetic valve body 3 by the permanent magnet PM the valve body is in contact with the valve seat VS at a biasing force when the magnet coil 5 is not supplied with an actuation current. When feeding an actuation current to the magnetic coil 5 to thereby generate a magnetic field coacting with the magnetic field generated by the permanent magnet PM, a force is exerted on the valve body 3 for displacing it a short distance, preferably about 0.1 mm, from the valve seat towards the coil 5 for opening the valve. As known per se in the art, the current fed to the coil 5 has a pulse-like form having a pulse length of about 50 microseconds for each generation of one drop.

A small amount of fluid becomes injected from the first chamber $C_1$ into the second chamber $C_2$ due to the pressure difference between the fluids F′, F″ in these two chambers when opening the valve by raising the valve body 3 some tenths of a millimeter from its contact with the valve seat VS. At this moment, the pressure in the second chamber increases, so that the process of forming a drop at the outlet formed by the nozzle 13 begins.

When switching off the coil by interrupting the actuation current after the lapse of said pulse period, the valve body 3 moves back towards the thin partition wall PW. In this situation the partition wall is bent either due to a pressure-wave generated by the valve body's movement towards the partition wall or generated by the physical contact of the valve body with the partition wall. The bending of the partition wall towards the second chamber $C_2$ causes a pulse-like increase of the pressure of the fluid F″ in the second chamber resulting in a completion of the forming of the drop at the nozzle.

Figure 2:
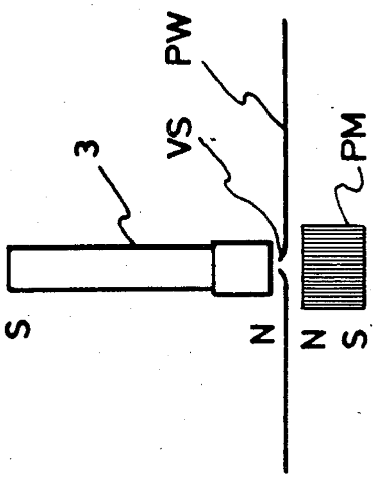
FIG. 2 shows a detail of the embodiment in accordance with FIG. 1.

FIG. 2 is a sketch for explaining the magnetic polarization resulting in the desired actuation of the valve body 3. The coil 5 induces a desired magnetic field causing a polarization of the valve body 3. The magnetic field generated by the current through the windings of the coil 5 is chosen to have a polarity such that the free end of the valve body becomes the magnetic northpole and that its other end becomes the magnetic southpole. Hence, the valve body 3 becomes repelled by the north-pole of the permanent magnet PM being arranged close to the bottom end of the valve body 3. Thus, the valve opens. The pre-biasing of the valve body for holding it in the closed position of the valve during the respecting resting phases can also be accomplished by using a coil spring (not shown here) instead of the permanent magnet for urging the valve body in its closed position. Alternatively, a coil spring may be provided for urging the valve body in its opened position instead of its closed position. In the latter case, the current fed to the actuation coil 5 must be chosen to have an opposite polarity and must be generated during the respective resting phases, e.g. for holding the valve device in its closed position.

Instead of using a solenoid valve device, other actuation devices adapted for opening and closing the valve seat can also be used. For example, piezoelectric or magnetostrictive elements can be used instead of the coil-valve body-actuation device.

Figure 3:
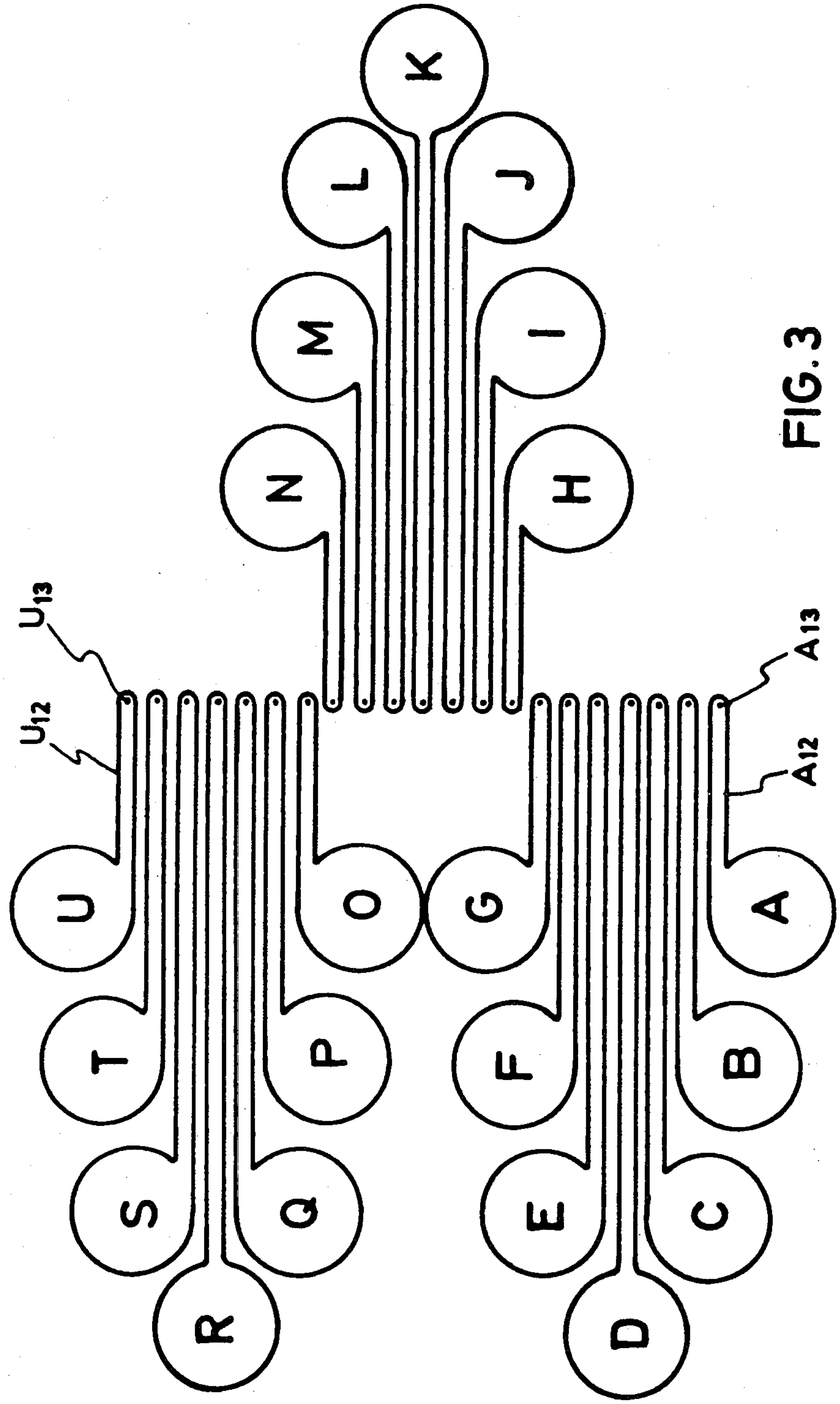
FIG. 3 shows the arrangement of 3×7 fluid jet printing devices forming a fluid printer.

FIG. 3 schematically shows the arrangement of a plurality of fluid jet printing devices together forming an ink jet apparatus or ink jet printer having 3×7 printing devices. These 21 fluid jet printing devices A to U together form a column for forming 21 dots on a registration medium like registration paper passing by the nozzle. The circles A to G, H to N and O to U schematically designate the housing or central portion of the respective printing devices. The fluid, preferably the ink, is conducted through the ducts $A_{12}$ to $U_{12}$ of the respective printing device to the associated nozzle $A_{13}$ to $U_{13}$.

The 21 fluid jet printing devices A to U have a common first duct plate 10a as well as a common second duct plate 10b. Moreover, a single, common partition wall PW as well as a common stuffing foil 11 is used for all of the 21 printing devices. Consequently, a printer consisting of a plurality of fluid jet printing devices formed by a low number of parts common to all of the printing devices is not only capable of a high frequency drop generation, but also has an extremely compact design.

I claim:

1. A fluid jet printing device comprising:

a first fluid chamber connected to an inlet for feeding fluid into said first chamber, said fluid within said first chamber being at a predetermined pressure;

a second fluid chamber having fluid therein at a pressure less than said predetermined fluid pressure in said first chamber and having a nozzle;

a diaphragm-like partition wall having a valve seat and separating said first and second chambers;

a movable actuation member and a valve seat in combination forming a valve;

means for selectively moving said member away from said wall to open said valve and inject fluid from said first chamber into said second chamber and form a fluid drop at said nozzle and selectively moving said member toward and into contact with said wall to bend said wall toward said second chamber and close said valve and increase the fluid pressure within said second chamber to further form said fluid drop and expel said fluid drop from said nozzle.

2. The device of claim 1 wherein said diaphragm-like partition wall has a thickness within the range of 0.01 to 0.3 mm.

3. The device of claim 1 wherein said diaphragm-like partition wall has a thickness within the range of 0.02 to 0.05 mm.

4. The device of claim 1 wherein said valve seat is a collar extending from an embossed hole in said diaphragm-like partition wall.

5. The device of claim 1 wherein said first fluid chamber includes a first plate having a plurality of said inlets and said second chamber includes a second plate having a plurality of said nozzles, with a common partition wall interposed between said first and second plates.

* * * * *